Nov. 17, 1925.  1,562,401

A. E. WILLIAMS

COMBINED SMOKE CONDUIT AND ABSORBENT HOLDER FOR TOBACCO PIPES

Filed Nov. 7, 1924

Witnesses:

Inventor:
Abraham E. Williams
By Joshua H. Potts
His Attorney

Patented Nov. 17, 1925.

1,562,401

UNITED STATES PATENT OFFICE.

ABRAHAM E. WILLIAMS, OF CHICAGO, ILLINOIS.

COMBINED SMOKE CONDUIT AND ABSORBENT HOLDER FOR TOBACCO PIPES.

Application filed November 7, 1924. Serial No. 748,302.

*To all whom it may concern:*

Be it known that I, ABRAHAM E. WILLIAMS, a citizen of the United States, and a resident of the city of Chicago, county of Cook, and State of Illinois, have invented certain new and useful Improvements in a Combined Smoke Conduit and Absorbent Holder for Tobacco Pipes, of which the following is a specification.

My invention relates to a combined smoke conduit and absorbent holder for tobacco pipes and has for its primary object the provision of a simple device of this character which will be highly efficient in use and economical in manufacture.

A further object is the provision of a device of this character which can be readily inserted in the stem of a tobacco pipe and as readily removed therefrom, and in which the absorbent can be readily renewed.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of a tobacco pipe having my improved device applied thereto;

Figures 3, 4:
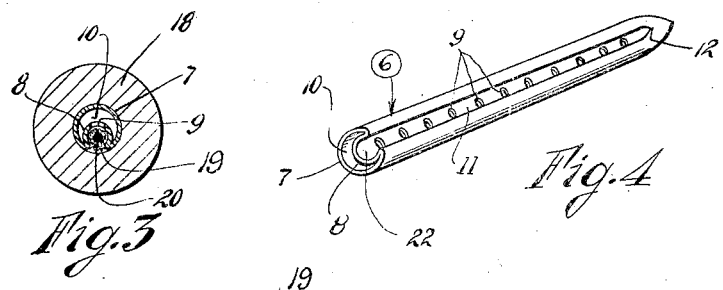
Fig. 3 is a cross section taken on the line 3—3 of Fig. 2.
Fig. 4 is a perspective view of the conduit with the absorbent removed, this view showing the conduit bottom side up.

My invention, in its preferred embodiment as illustrated in the accompanying drawing, comprises a conduit member denoted as a whole by the numeral 6 and having a top wall portion 7 of convex form and a bottom wall portion 8 of concave form, the bottom wall portion 8 being of less cross dimension than the top wall portion 7 and being curved within the curve of the top wall portion as clearly illustrated in Fig. 4.

The bottom wall portion 8 constitutes a continuation, in the preferred form as shown, of the top wall portion 7, and the same is provided with a series of apertures 9. These apertures 9 provide direct communication between the smoke passageway 10 and the open bottom side 11 produced by the concavity of the bottom wall portion 8.

The rear extremity 12 of this conduit member is approximately of tubular form, the bottom wall portion 8 curving outwardly at 13 in order to produce this form of extremity which preferably has a diagonally cut, smoke receiving opening 14, designed to come within the interior 15 of the pipe bowl 16 when the conduit member is properly inserted in the smoke channel 17 of the pipe stem 18. While the conduit member is preferably made with the approximately tubular end 12 as described, it may, if desired, be made without such form of extremity, being constructed with, the convex top wall portion and concave bottom wall portion continuing substantially unchanged to constitute the extremity of the device.

Figure 1:
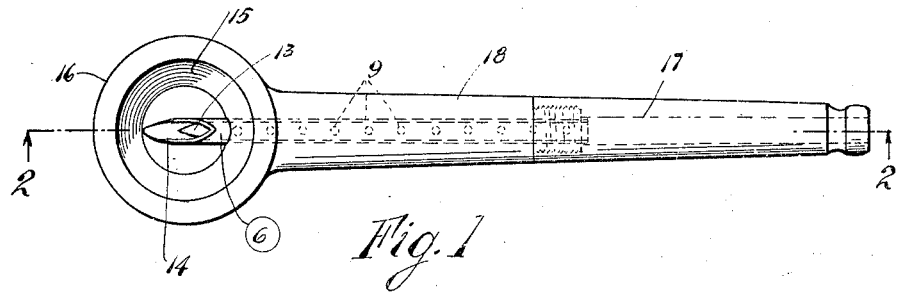
Figure 2:
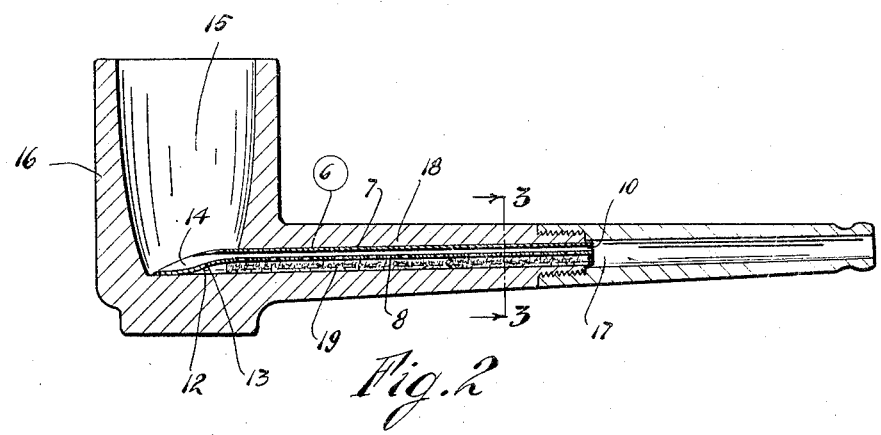
Fig. 2 is a longitudinal sectional view taken on the line 2—2 of Fig. 1.
Figure 5:
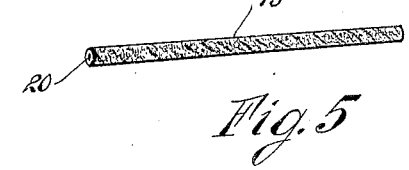
Fig. 5 is a detail view of a length of absorbent material, reenforced by a wire.

The bottom wall portion 8 serves as a holder for the absorbent material 19 which may consist of cotton material, cotton batting or any other suitable absorbent material. Obviously, as illustrated in Fig. 2, the conduit is inserted in the pipe stem with the open side downward, so that the nicotine and liquids resulting from the smoking operations will drop through the apertures 9 onto the absorbent material. For ready application and removal the absorbent material may be wound, rolled or otherwise secured about a wire element as 20. Thus in Fig. 5 I illustrate the absorbent material 19 secured about the wire 20 so as to provide a rod-like structure that may be readily inserted in and removed from the open side of the concave bottom wall portion 8 through the open end 22 thereof. My novel conduit and absorbent holder is readily inserted in the pipe stem owing to the open side 11 in the bottom thereof, while the absorbent material tends to serve as a yielding filler to completely fill up the interior of the pipe stem.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what

I claim as new and desire to secure by Letters Patent is:

1. A device for use in a tobacco pipe comprising a hollow elongated member provided with an exterior channel at one side, substantially as described.

2. A device for use in a tobacco pipe comprising a hollow elongated member provided with an exterior channel, there being apertures providing communication between the interior of the elongated member and said channel, substantially as described.

3. A combined smoke conduit and absorbent holder for tobacco pipes comprising a top wall portion and a bottom wall portion, there being a series of apertures in the bottom wall portion and the bottom wall portion being adapted to retain absorbent material, substantially as described.

4. A combined smoke conduit and absorbent holder for tobacco pipes comprising a curved top wall portion and a bottom wall portion curved relatively thereto to produce an exterior channel, there being apertures in the bottom wall portion, and absorbent material removably entered in the channel of the curved bottom wall portion, substantially as described.

5. A combination smoke conduit and absorbent holder for tobacco pipes comprising a curved top wall portion and a bottom wall portion curved in relation thereto, and an end portion of approximately tubular form constituting a continuation of said top and bottom wall portions, substantially as described.

6. A combined smoke conduit and absorbent holder for tobacco pipes comprising a curved top wall portion and a bottom wall portion curved in relation thereto, an end portion of approximately tubular form constituting a continuation of said top and bottom wall portions, there being apertures in the bottom wall portion and the bottom wall portion being adapted to retain absorbent material, substantially as described.

7. A smoke conduit for tobacco pipes comprising two upwardly curved wall portions, the curve of one wall portion being within the curve of the other wall portion and spaced therefrom, one of the wall portions having a series of apertures therein, substantially as described.

8. A smoke conduit for tobacco pipes comprising a convex top wall portion and a concave bottom wall portion spaced therefrom, the bottom wall portion constituting a retaining element and having apertures therein, substantially as described.

9. In combination with a tobacco pipe, a smoke conduit disposed in the stem of the pipe and comprising a curved top wall portion and a bottom wall portion curved in relation thereto, the bottom wall portion having apertures therein, and absorbent material disposed in the curve of the bottom wall portion, substantially as described.

10. In combination with a tobacco pipe, a smoke conduit disposed in the stem of the pipe and comprising a convex portion and a concave portion spaced thereform to form a passage way, and one of the wall portions having apertures therein and being adapted to retain absorbent material, substantially as described.

In testimony whereof I have signed my name to this specification.

ABRAHAM E. WILLIAMS.